Sept. 21, 1965  A. E. HILLIKER  3,208,039
DIAMOND INTERCHANGE CONTROLLER
Filed Nov. 20, 1962  13 Sheets-Sheet 1

FIG. I

INVENTOR.
ARTHUR E. HILLIKER.
BY
D. Emmett Thompson
HIS ATTORNEY.

Sept. 21, 1965 A. E. HILLIKER 3,208,039
DIAMOND INTERCHANGE CONTROLLER
Filed Nov. 20, 1962 13 Sheets-Sheet 2

INVENTOR.
ARTHUR E. HILLIKER.
BY
D. Emmett Thompson
HIS ATTORNEY.

Sept. 21, 1965  A. E. HILLIKER  3,208,039

DIAMOND INTERCHANGE CONTROLLER

Filed Nov. 20, 1962  13 Sheets-Sheet 3

INVENTOR.
ARTHUR E. HILLIKER.
BY
D. Emmett Thompson
HIS ATTORNEY.

Sept. 21, 1965

A. E. HILLIKER 3,208,039

DIAMOND INTERCHANGE CONTROLLER

Filed Nov. 20, 1962

INVENTOR.
ARTHUR E. HILLIKER.
BY
D. Emmett Thompson
HIS ATTORNEY.

Sept. 21, 1965    A. E. HILLIKER    3,208,039
DIAMOND INTERCHANGE CONTROLLER
Filed Nov. 20, 1962    13 Sheets-Sheet 5

TERMINAL INTERSECTION CONTROLLER NUMBER 1

INVENTOR.
ARTHUR E. HILLIKER.
BY D. Emmett Thompson
HIS ATTORNEY.

TERMINAL INTERSECTION CONTROLLER
NUMBER TWO

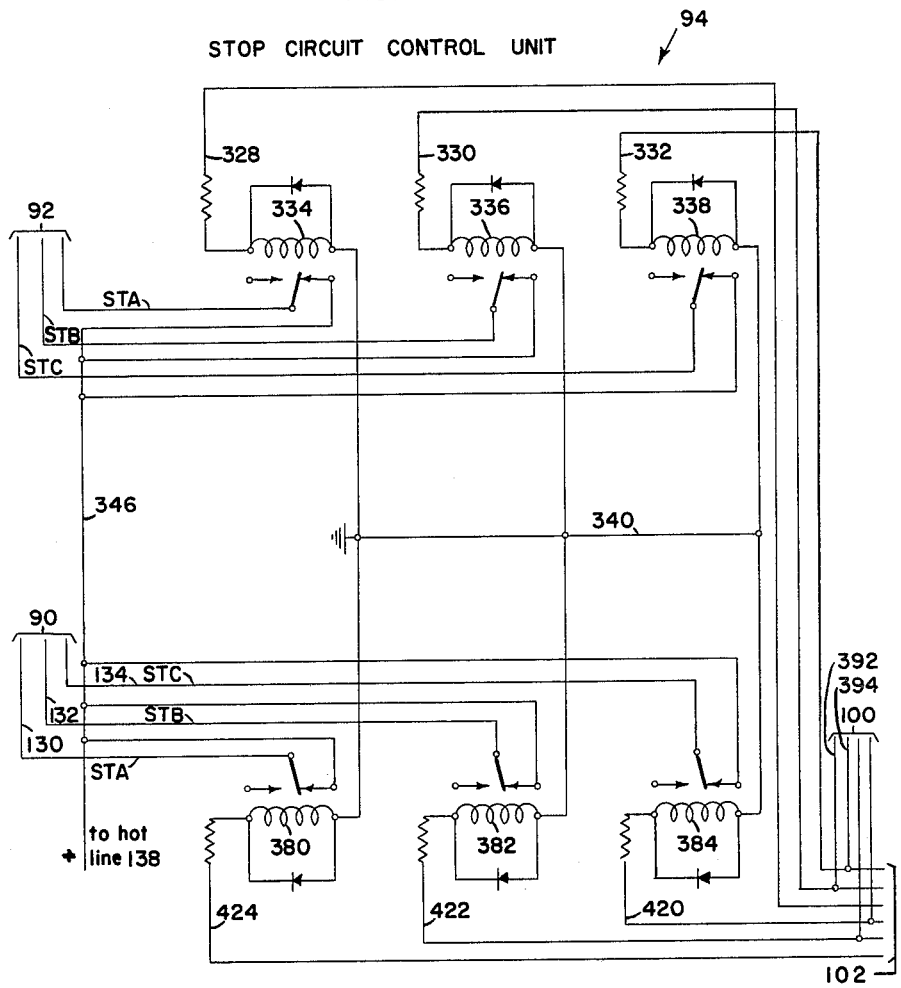

OFFSET TIMER
PHASE B

INVENTOR.
ARTHUR E. HILLIKER.
BY
D. Emmett Thompson
HIS ATTORNEY.

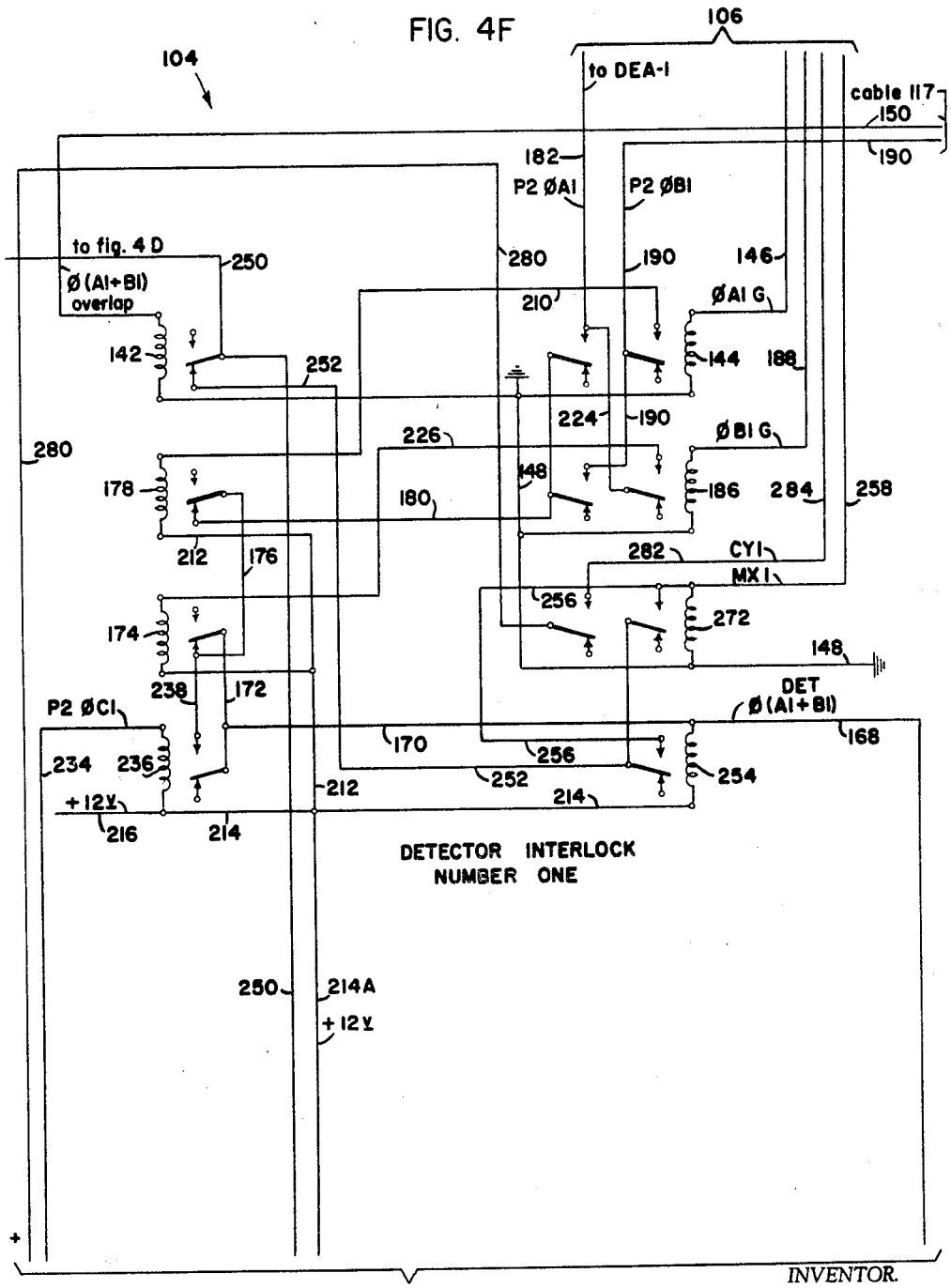

Sept. 21, 1965  A. E. HILLIKER  3,208,039
DIAMOND INTERCHANGE CONTROLLER
Filed Nov. 20, 1962  13 Sheets-Sheet 11

DETECTOR INTERLOCK NUMBER TWO

INVENTOR.
ARTHUR E. HILLIKER.
BY
HIS ATTORNEY.

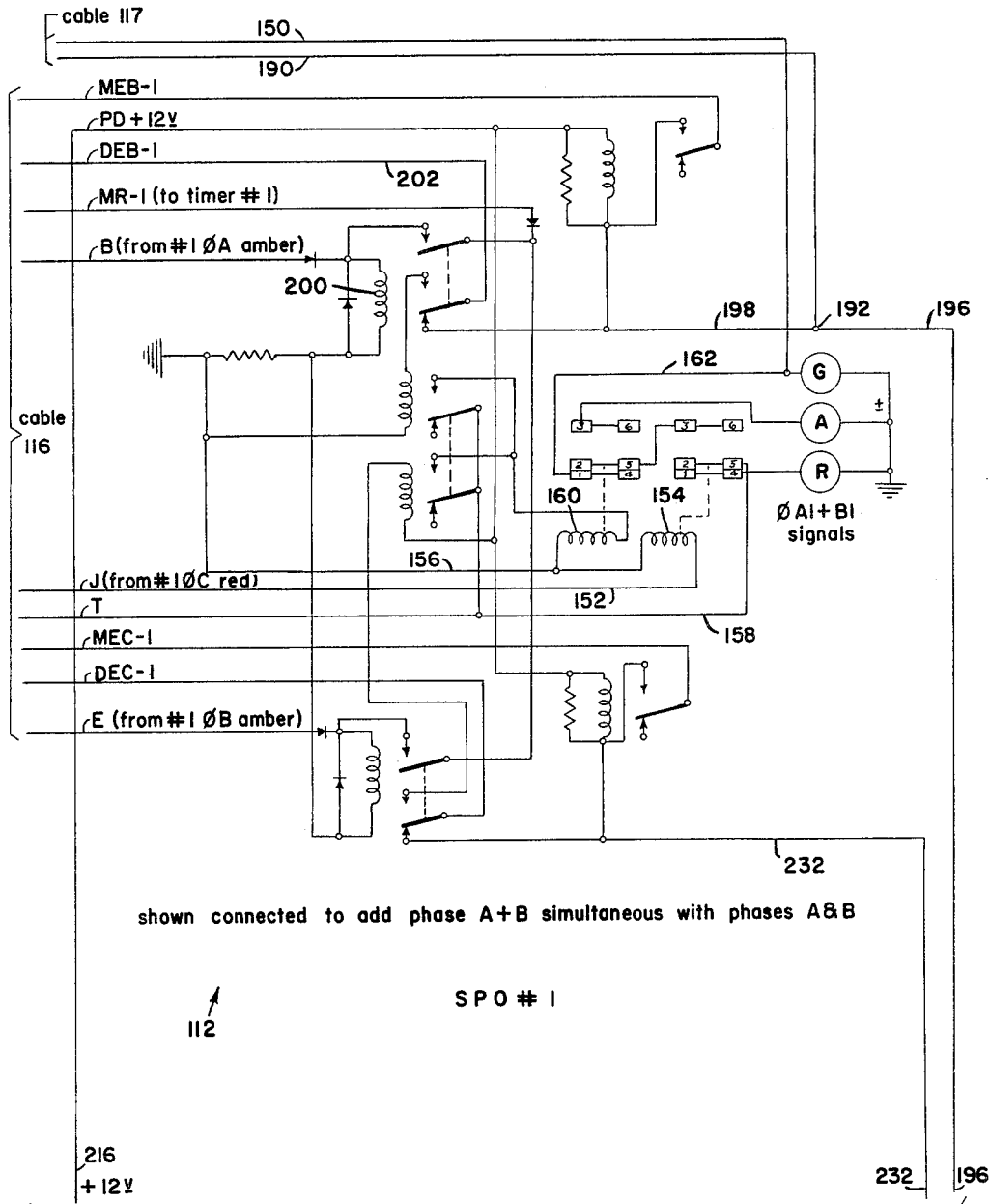

Sept. 21, 1965  A. E. HILLIKER  3,208,039
DIAMOND INTERCHANGE CONTROLLER
Filed Nov. 20, 1962  13 Sheets-Sheet 13 shown connected to add phase A+B simultaneous with phases A & B

SPO #2

INVENTOR.
ARTHUR E. HILLIKER.
BY
D. Emmett Thompson
HIS ATTORNEY.

3,208,039
DIAMOND INTERCHANGE CONTROLLER
Arthur E. Hilliker, Pulaski, N.Y., assignor to Crouse-Hinds Company, Syracuse, N.Y., a corporation of New York
Filed Nov. 20, 1962, Ser. No. 238,938
10 Claims. (Cl. 340—35)

This invention relates to and has as a general object the control of traffic passing through a diamond interchange. A diamond interchange is well understood in the art as being the two terminal intersections that are created by the diamond pattern of the on and off ramps of a freeway or limited access highway as they intersect a cross street artery. Such diamond interchanges are created each time a limited access highway is constructed when the on and off ramps for the limited access highway intersect a cross artery, as above set forth. Accordingly, there has been a need in the traffic signalling art for a controller to efficiently move the traffic entering the diamond interchange, both from the ramps of the limited access highway and the cross artery through the diamond interchange. As will be obvious from the above, the diamond interchange is essentially two intersections located in relatively close proximity to each other. Each of the intersections of the diamond interchange are known as terminal intersections and each has a minimum of four distinct traffic movements therethrough. One of these movements may be termed an overlap movement, and may be given the right-of-way signal display simultaneous with two other movements with which the overlap movement does not conflict. These other two movements, however, do conflict with each other and with a fourth movement which also conflicts with the overlap movement.

Accordingly, it is a general object of the invention to provide a traffic control system and apparatus for efficiently moving traffic through the two terminal intersections comprising the diamond interchange.

It is an additional object of the invention to provide a system and apparatus for presenting a right-of-way signal display to the overlap movement at each of the intersections simultaneous with the right-of-way display to either of the two movements with which the overlap movement does not conflict.

Prior to this time, a calling detector relay, as is well known and understood in the art, has been utilized in conjunction with an overlap movement in order to obtain the simultaneous right-of-way signal display to the overlap movement and either of the other two non-conflicting movements. In such an arrangement, however, the calling detector relay operates to render the overlap detector inoperative during certain portions of the traffic cycle, which accordingly prevents the controller for the intersection from operating with optimum efficiency. For example, a detection of the overlap detector will cause the proceed signal for the overlap movement to be energized, after which the calling detector relay is, by virtue of its operation, disconnected so that further actuations of the overlap detector will not extend the right-of-way signal display to either of the other two non-conflicting movements, or to the overlap movement.

It is, therefore, an object of this invention to provide a detector interlock unit which will perform the following functions:

(a) If the right-of-way signal display is being presented to the overlap movement, and one of the movements with which the overlap movement does not conflict, additional actuations of the overlap detector will extend the right-of-way signal display to both movements.

(b) If the right-of-way signal display is being presented to the other non-conflicting movement and the overlap movement, additional detector actuations on the overlap movement will extend the right-of-way signal display to both movements.

(c) When a call is received on the detector of the non-conflicting movement not having the right-of-way, additional detector actuations on the overlap movement will discontinue extending the right-of-way signal display to the other non-conflicting movement, unless there is a call on the fourth movement, which conflicts with all other movements, in which case detector actuations of the overlap movement will continue to extend the right-of-way signal display to the movement receiving the right-of-way signal display which does not conflict with the overlap movement, and which immediately precedes the fourth movement in the cycle of the traffic signal controller.

(d) If the movement which conflicts with all other movements is receiving the right-of-way signal display, an actuation of the overlap detector will transfer the right-of-way signal display to a pre-selected one of either of the other two movements which do not conflict with the overlap movement where neither of said movements has received a detector actuation; if, however, one of said two movements has received an actuation along with or subsequent to the actuation on the overlap movement, it will receive the right-of-way together with the overlap movement.

It is a further object of the invention to provide an offset timer for co-ordinating the right-of-way signal display transfer sequence for the traffic signal controllers individual to each of the terminal intersections of the diamond interchange, so as to allow vehicles entering one of said intersections sufficient time to reach and actuate the detectors of either the overlap movement, or one of the non-conflicting movements associated with the overlap movement, so as to extend the right-of-way signal display to the overlap movement and its associated non-conflicting movement, so as to allow the vehicles to completely clear the diamond interchange.

In this connection, it is an object of this invention to provide means for selectively eliminating, if desired, the co-ordination between the multi-phase controllers where no need is present to extend the right-of-way signal display on one of the movements, so as to allow a movement proceeding through one of the intersections to obtain the right-of-way signal display at the second intersection.

Briefly described, therefore, the invention comprises a full actuated multi-phase traffic signal controller individual to each of the terminal intersections of the diamond interchange, an overlap accessory unit associated with each of the multi-phase controllers, a pair of interlock units associated with each controller, and a pair of offset timers, each of which is associated with both controllers, and a control unit, all of said units being connected to give the results hereinbefore set forth.

It will be further understood that the detector interlock units, and the offset timer units are capable of independent use and application, and are shown in connection with the diamond interchange control system for purposes of explanation only, and are not to be considered limited, except by the scope of the appended claims.

The multi-phase full-actuated controllers utilized by this invention are of the same general type disclosed in the Jeffers Patent No. 3,146,421 and operate substantially identical to the operation disclosed in said application, being modified only by their interconnection with the other units, as will be disclosed hereinafter.

The invention consists in the novel features and in the combinations and constructions hereinafter set forth and claimed.

In describing this invention reference is had to the accompanying drawings in which like characters designate corresponding parts in all the views.

In the drawings—

GENERAL DESCRIPTION

Figure 1:
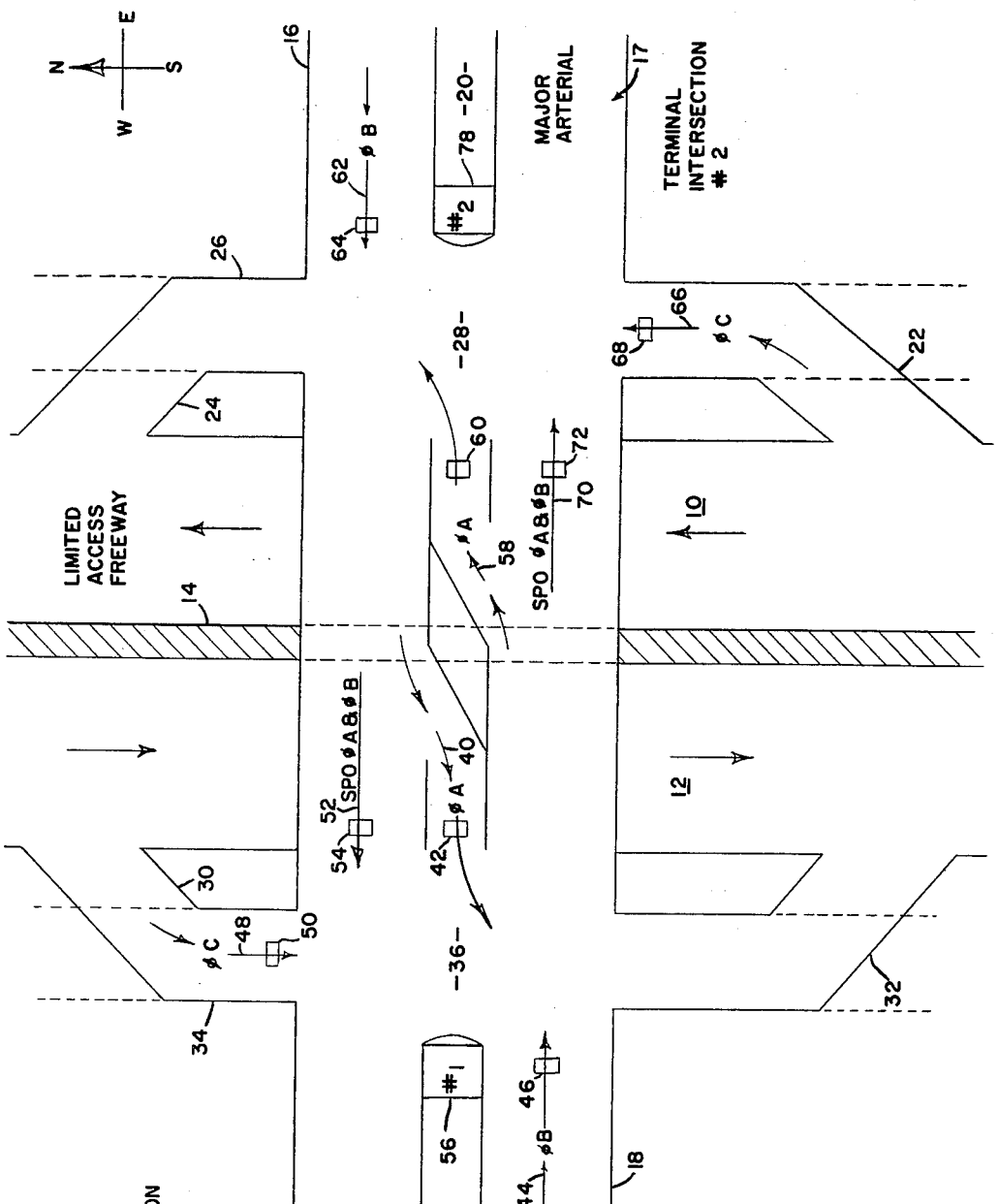
FIGURE 1 is a schematic illustration of a diamond interchange.

In FIGURE 1, the freeway, or limited access highway, is shown as having a northbound lane 10 and a southbound lane 12, which are divided by a barrier mall, or the like 14. The cross artery has a westbound lane 16 and an eastbound lane 18 divided by a barrier 20 and may pass over or under the limited access highway. The limited access highway lane 10 is shown as having off-ramps 22 and on-ramps 24 which interconnect with a one-way northbound frontage road, or artery 26, the terminal intersection between the frontage road 26 and the major cross artery 17 being designated by the reference numeral 28. Similarly, the limited access highway southbound lane 12 has an off-ramp 30 and an on-ramp 32 interconnected with a one-way southbound frontage road, or artery 34. The terminal intersection between the frontage artery 34 and the cross artery 17 is designed by the reference numeral 36. For ease of description hereinafter, the intersection 36 will be referred to as Terminal Intersection One, while the intersection 28 will be referred to as Terminal Intersection Two.

As will be seen the physical outline, or pattern of the connection between the limited access highway ramps the frontage road, and cross artery, forms a diamond outline, thus giving rise to the term in the art of a "diamond interchange."

The various movements through Terminal Intersection One are identified as follows: The phase A movement is indicated by arrow 40, and this movement is provided with a detector 42; phase B movement by arrow 44 having a detector 46; the phase C movement by arrow 48 having a detector 50, and the overlap movement known as a phase A plus phase B movement by the arrow 52, which has a detector 54. The traffic signals for controlling these movements have not been shown for purposes of clarity on FIGURE 1, but comprise the conventional proceed or green, clearance or amber, and stop or red signals, and the transfer sequence between the various signals individual to each movement is controlled by a multi-phase full-actuated controller indicated by the reference numeral 56. This controller is of the same general type described in the Jeffers patent, Number 3,146,421, above-referred to, to which application reference may be had for a more complete disclosure.

The various traffic movements through Terminal Intersection Number Two and their detectors are similarly identified by reference numerals 58 to 72, inclusive, as shown on the righthand side of FIGURE 1. These movements are controlled by conventional traffic signals (not shown), and the transfer of right-of-way signal display sequence for these signals being controlled by a second multi-phase full-actuated controller of the type shown in the Jeffers patent, above-identified, as is indicated by the block 78.

It will be apparent by a consideration of the various movements that the phase A, and phase B movements at each intersection, while conflicting with each other, do not conflict with the overlap movement, phase A plus phase B, and that the phase C movement will conflict with each of the phase A, phase B and phase A plus B movements.

Accordingly, it is desirable that the overlap movement be given the right-of-way signal display simultaneous with the right-of-way signal display to either of the phase A, or phase B movements. In addition, it is desirable that when either of the phase A, or phase B movements is receiving the right-of-way simultaneous with the overlap movement, additional actuations of the overlap movement detector should operate to extend the right-of-way signal display to the phase A, or phase B movement, as the case may be.

Also, if the right-of-way signal display is to be transferred from phase A to phase B, by virtue of a detector actuation on phase B, additional detector actuations on the overlap detector should discontinue extending the phase A right-of-way.

In like manner, additional detector actuations on the overlap detector should discontinue extending the phase B right-of-way, if there is a detector call on phase A, unless there is a call on phase C, in which case phase B right-of-way should continue to be extended, since by virtue of the operation of the 3-phase full-actuated controller for the intersection, phase C will appear next in the sequence.

Finally, when the right-of-way is on phase C, detector actuations of the overlap detector should transfer, or call the right-of-way to either phase A, or phase B, depending upon which of these movements has received a detector actuation, and in the case where there are no actuations, the right-of-way should be transferred from phase C to either of phase A or phase B by a predetermined selection or setting.

As will be more completely described hereinafter, all of these desirable results, which are new in the art of traffic signal control, are achieved by the detector interlock unit operating in conjunction with a 3-phase controller for the intersection.

Figure 2:
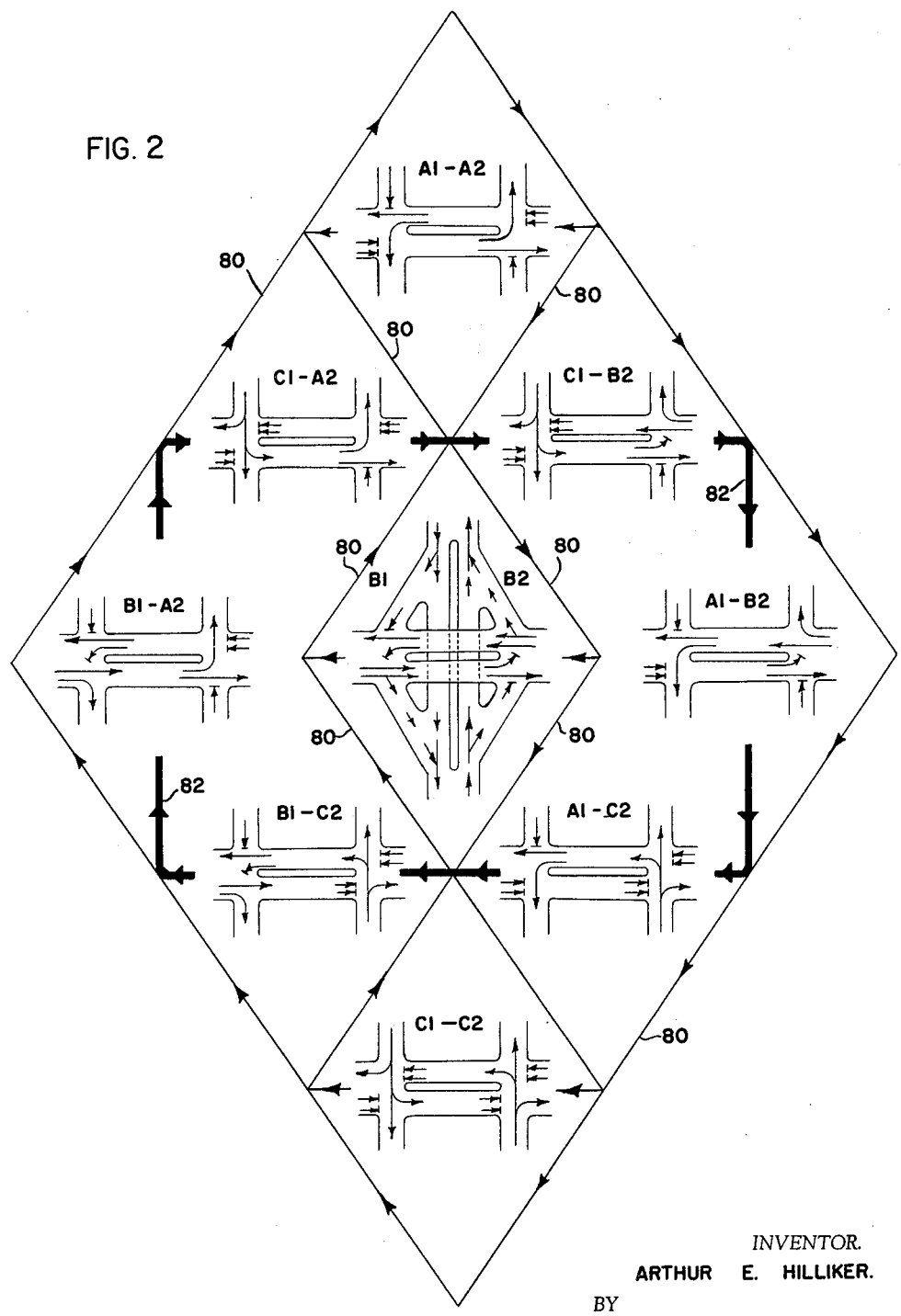
FIGURE 2 is a flow diagram showing the various right-of-way transfer sequences of the control system.

In FIGURE 2, a flow diagram is shown in which the transfer sequence for the right-of-way signal display is shown by indicating a plurality of diamond interchange intersections composed of first and second terminal intersections, and in each such illustration the right-of-way sequence is indicated above the intersection. For example, the topmost intersection is provided with the indication "A1–A2." This means that in both the first and second terminal intersections, the phase A, or left turn movement is receiving the right-of-way signal display.

It will be noted from the flow diagram that there are nine possible right-of-way patterns, and the light-arrowed line 80 indicates that the control system will function to transfer the right-of-way signal display pattern from any of the nine patterns *directly* to any other pattern without necessity for passing through any intermediate pattern. Accordingly, the control system has achieved the ultimate in flexibility in the traffic signal art.

Further, the heavy-arrowed line 82 indicates the right-of-way signal display transfer sequence in the presence of heavy and continuous traffic. It will be noted that the heavy-arrowed line 82 interconnects six of the traffic patterns, and that the transfer from pattern to pattern will take place in an alphabetical order. As will be obvious, this will permit each movement at each intersection to receive a right-of-way signal display, thereby continuously allowing the various movements sufficient time to clear the intersection, and in turn the diamond interchange. This alphabetical pattern transfer, or phasing will occur by virtue of the offset timer associated with the control system, as will be more completely described hereinafter.

Figure 3:
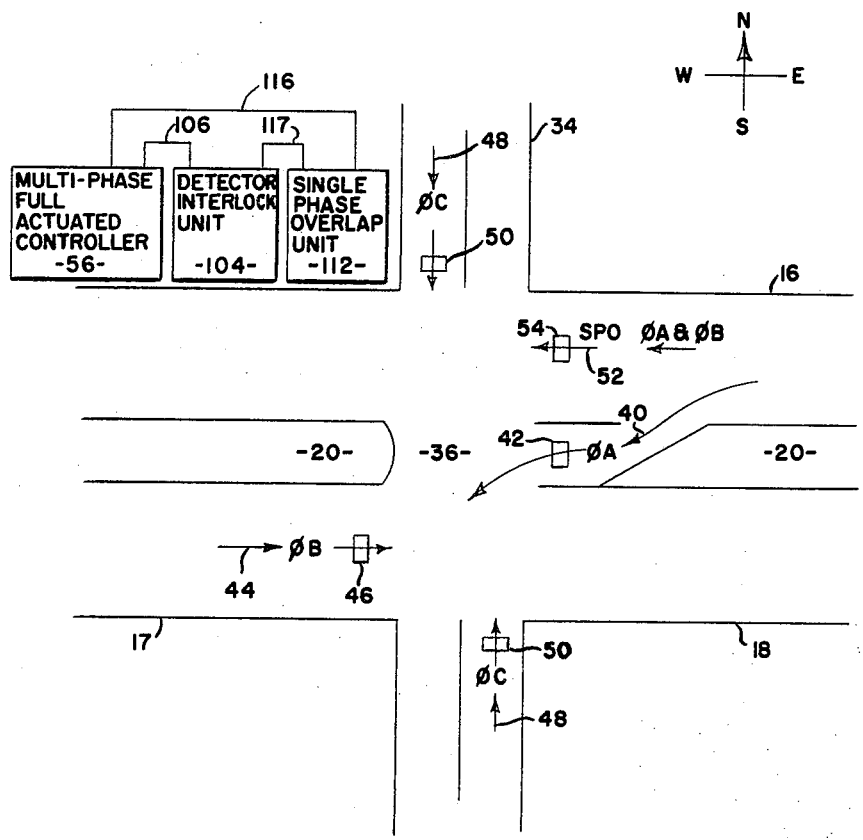
FIGURE 3 is a schematic illustration of a single intersection showing an application for independent utilization of the detector interlock unit.

In FIGURE 3, which is a view of a single intersection, the various movements have been supplied with the same reference numerals as applied to the movements in Terminal Intersection One of FIGURE 1. As will be more completely described hereinafter, the detector interlock unit comprising a part of the invention will function to give the optimum in movement of the four traffic movements through the intersection.

Figure 4:
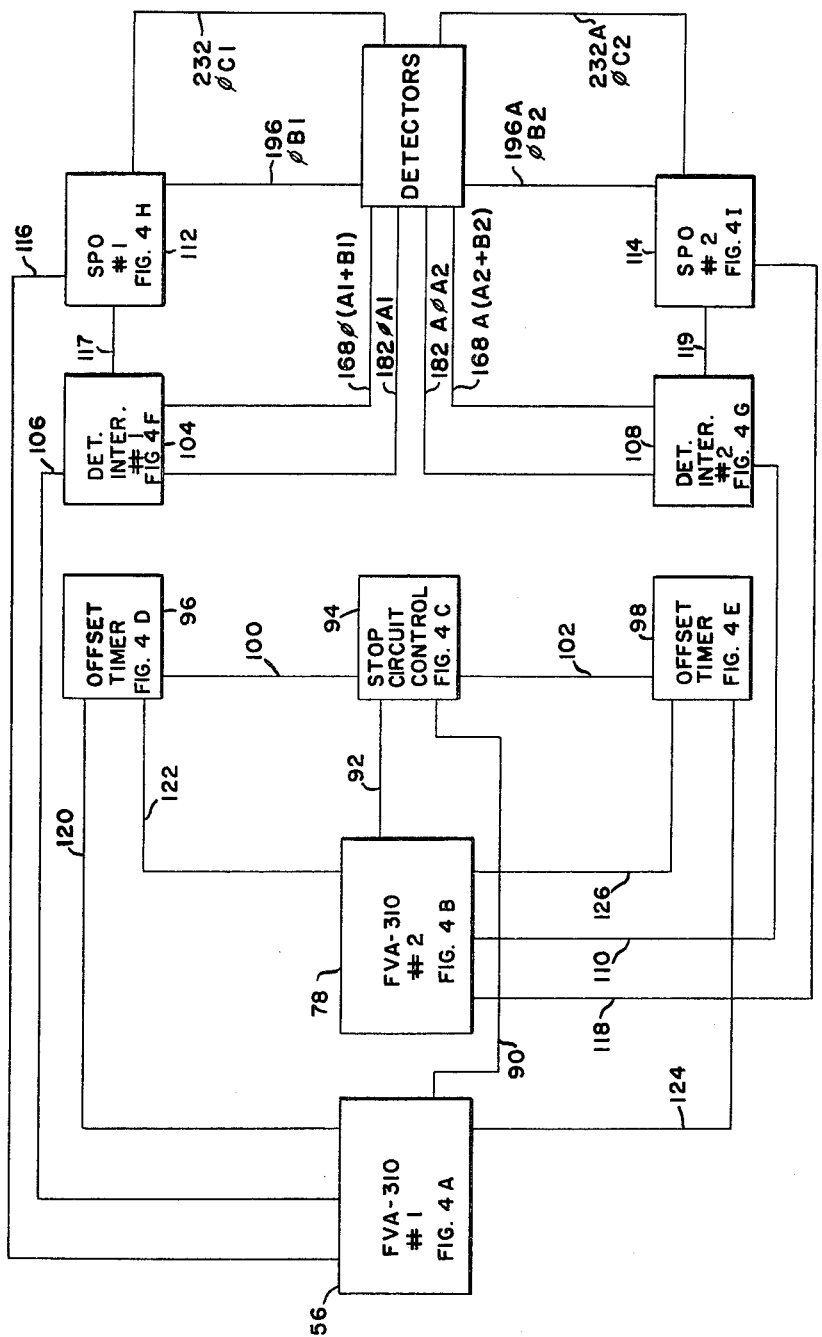
FIGURE 4 is a block diagram for the various components of the control system, and FIGURES 4A to 4J, inclusive, illustrate the circuit diagrams for the various components, and when these diagrams are placed together in the manner indicated in FIGURE 4, a complete circuit diagram for the control system is illustrated.

FIGURE 4 is a block diagram of the various components of the control system wherein the 3-phase, full-actuated controllers 56 and 78 are identified by the caption "FVA 310 Number 1," and "FVA 310 Number 2." The top circuits for the two controllers 56 and 78 are connected by cables 90 and 92 to the block 94, which is a stop circuit control unit. The control system comprises, in addition, a pair of offset timers 96 and 98 which are connected by cables 100 and 102 to the stop circuit control unit 94. A detector interlock unit for the Number One controller is identified by reference numeral 104, and is interconnected therewith by cable 106, while a director interlock unit 108 for controller Number Two is interconnected with the Number Two controller by cable 110. Finally, the control system is provided with a pair of single phase overlap units 112 and 114, the unit 112 is connected by cable 116 to the Number One controller, and the unit 114 is connected by cable 118 to the Number Two controller. Unit 112 is connected to unit 104 by cable 117 and unit 114 is connected by cable 119 to unit 108. It will also be noted that offset timer 96 is connected by cables 120 and 122 and offset timer 98 is connected by cables 124 and 126 to the Number One and Number Two controllers, respectively.

Figure 4A:
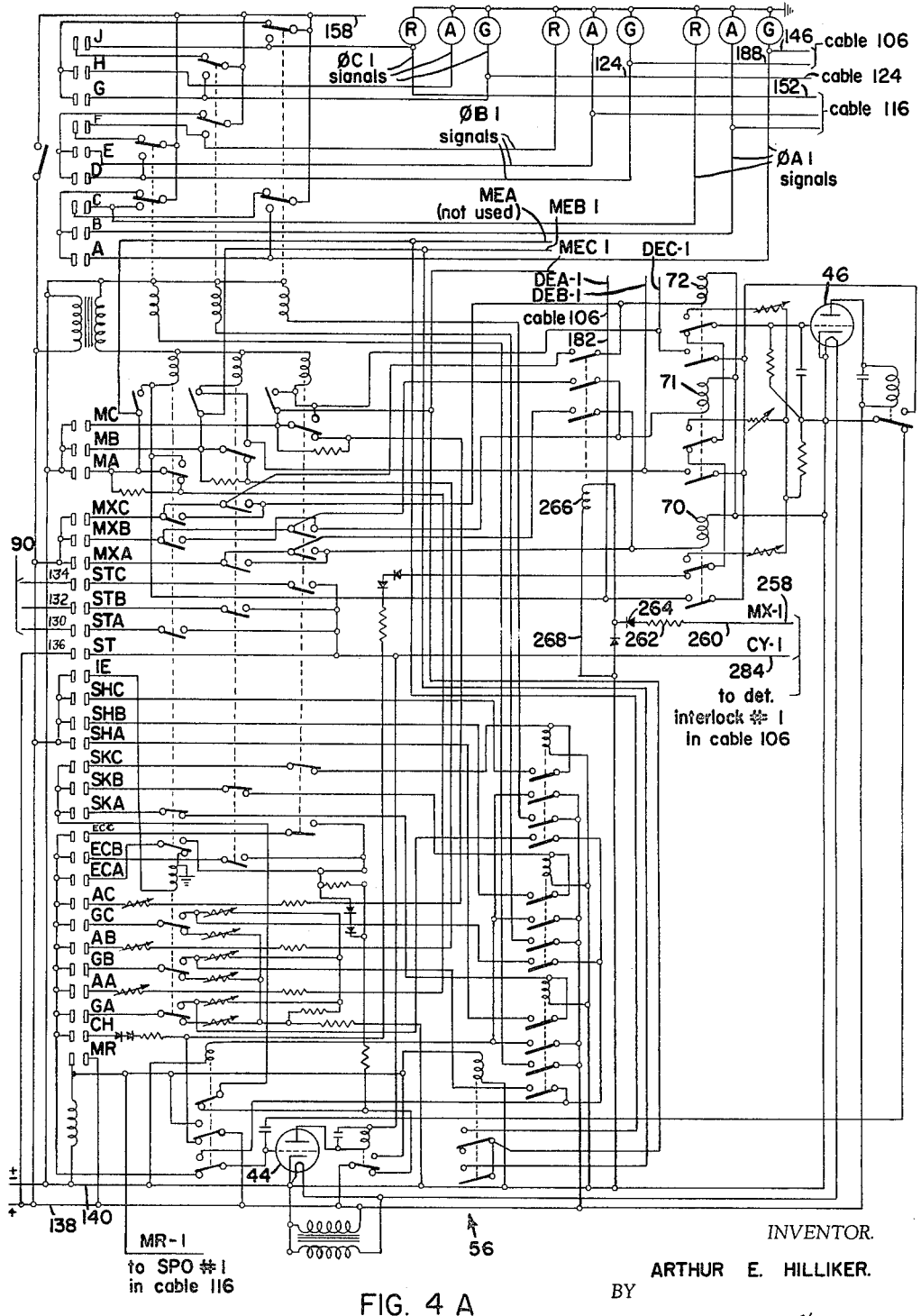
Figure 4:
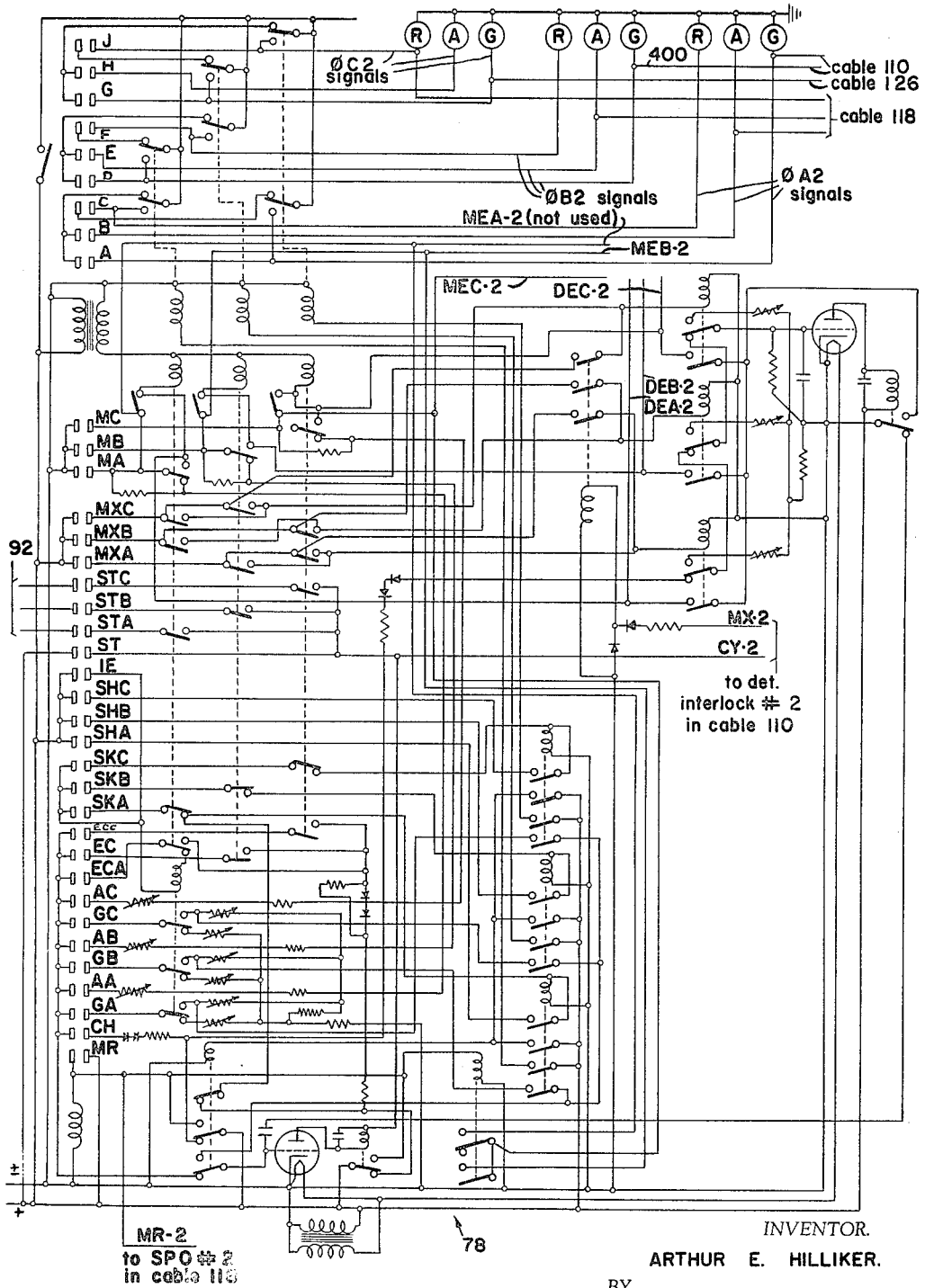
Figure 4D:
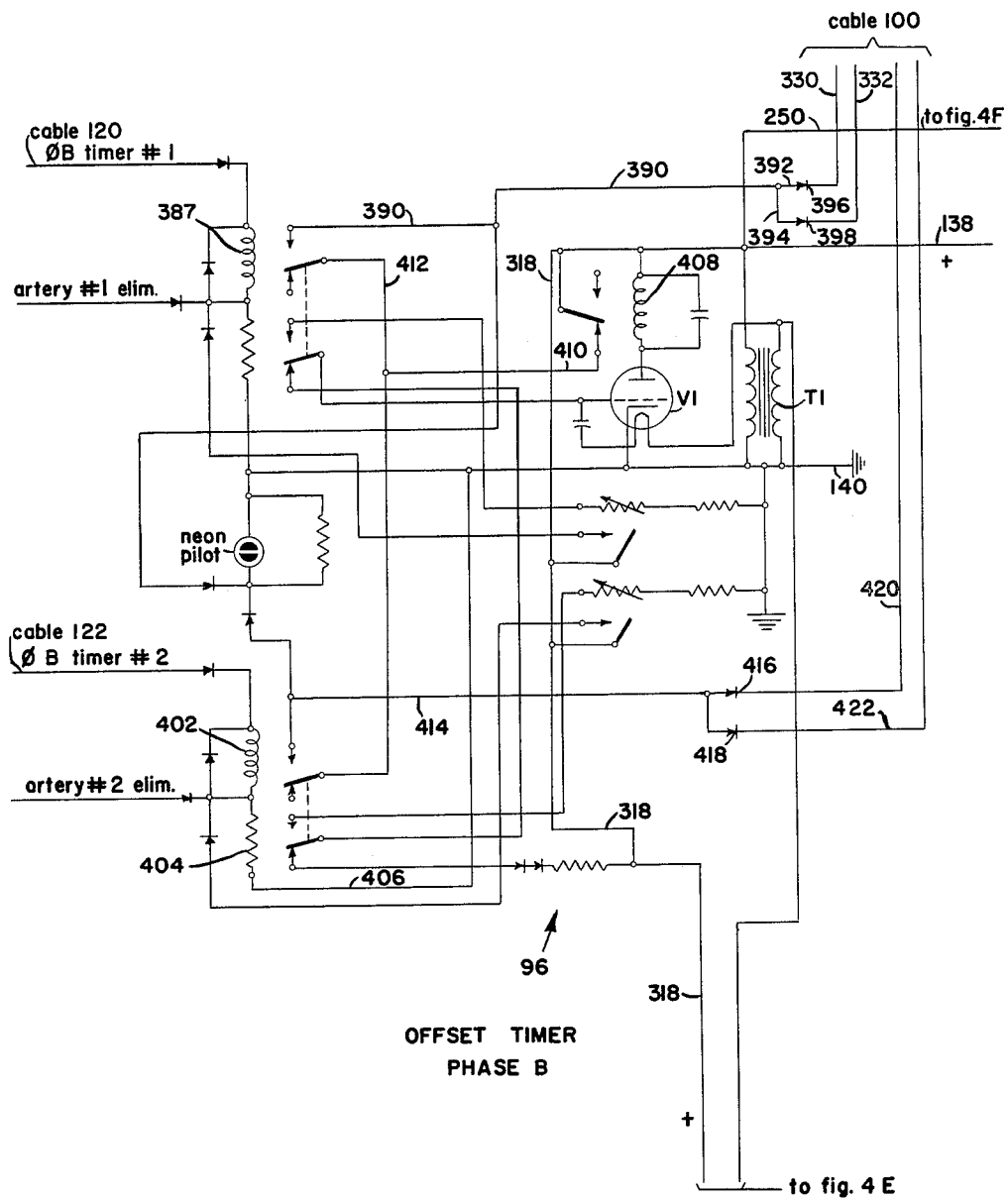

The circuit diagram for the Number One controller 56 is shown in FIGURE 4A, and the circuit diagram for the Number Two controller is shown in FIGURE 4B. FIGURE 4C illustrates the circuit diagram for the stop circuit control unit 94, and the cable connections 90, 92, 100, 102 thereto. FIGURES 4D and 4E are the circuit diagrams for the offset timers 96 and 98, respectively, and show the cable conections 100, 120, 122, 102, 124 and 126, respectively. FIGURES 4F and 4G are the circuit diagrams for the detector interlock units 104 and 108, respectively, and cable connections 106 and 110. FIGURES 4H and 4I are the circuit diagrams for single phase overlap unit 112 and 114, and cable connections 116 and 118, respectively.

DETAILED DESCRIPTION

Detector interlock units

The operation of the terminal intersection controllers Number One and Number Two, identified by reference numerals 56 and 78, respectively, is set forth in detail in the Jeffers patent, Number 3,146,421.

The only change is that the stop circuits for these controllers, which were all connected to a hot feed in the arrangement shown in Jeffers patent, are now individually connected to the stop circuit control unit, so as to obtain complete control of the right-of-way transfer sequence. Referring now to FIGURE 4A, it will be seen that the stop circuit lines for phase A, phase B, and phase C, identified by reference numerals 130, 132, 134, respectively, are connected by the cable 90 to the control unit 94. The carry-over stop circuit line 136 is connected to the hot side 138 of a 115 volt, 60 cycle A.C. power supply, including a common, or return line 140.

Similarly, the stop circuits for the controller 78 are connected by the cable 92 to the control unit 94.

The various stop circuits from the controllers 56 and 78 will be opened and closed by the operation of the control unit 94, and the offset timers 96 and 98 in order to control the right-of-way transfer sequence.

As set forth in the general description of operation, the detector interlock units 104 and 108 control the operation of the single phase overlap units 112 and 114, so as to achieve five separate functions. As shown in the drawings, and particularly in FIGURE 1 thereof, the overlap units are connected so as to operate simultaneously with both of phases A and B of the terminal intersection controllers 56 and 78.

If the right-of-way is on phase A, identified by arrows 40 and 58 in FIGURE 1, the overlap detector 54 or 72, as the case may be, will operate as though it were connected in parallel with the phase A detectors 42 and 60. Referring to FIGURE 4F, it will be seen that the overlap unit relays 142 and 144 will be energized during the controller Number One phase A green interval by a circuit comprising line 146, which is connected to the phase A green signal circuit so as to provide the line 146 with a hot feed during the phase A green interval, and line 146 is connected through the coil of relay 144 to the ground line 148, thereby energizing the relay 144. Relay 142 is energized through a circuit consisting of line 150, which is connected to the overlap phase A plus B signal circuit so as to provide the line 150 with a hot feed during the overlap phase green interval, and line 150 is connected through the coil of relay 142 to the grounded line 148, thereby energizing the relay 142.

The signal circuit for the overlap phase green interval is energized by virtue of the hot feed placed on line 152, which is connected to the signal circuit for the phase C red, FIGURE 4H, or stop interval, so as to provide the line 152 with a hot feed during this interval, which, as will be realized, occurs when the phase A is receiving the proceed signal, and the line 152 is connected through the coil of a relay 154 in the overlap unit 112, as shown in FIGURE 4H, to a ground line 156, thereby energizing the relay 154. The energization of the relay 154 causes the armature of the relay, which is a two-pole double-throw type relay to move into engagement with the upper contacts, thereby completing a circuit from the hot line 158, through the armature and upper contacts of relay 154, and the armature and lower contacts of a relay 160 to the signal circuit line 162, thereby energizing the proceed signal for the overlap phase movement indicated by the arrow 52, for the terminal intersection 36. As previously pointed out, this will provide the line 150 with the hot feed to energize the relay 142.

The energization of the relay 144 will complete a ground feed each time the overlap detector 54 is actuated to the phase A detector relay in the controller 56, so as to provide an extension for the phase A green interval each time such a detector actuation is received. This extension operation is identical to that described in the Jeffers' application. The circuit for obtaining the extensions of the phase A green, by virtue of actuations of the overlap detector is shown in FIGURES 4E, 4G and 4F and comprises ground line 140, line 166 in FIGURE 4E, which is connected by each actuation of the detector 54 to line 168, line 170, line 172, through the armature and normally closed contact of a relay 174 in the detector interlock unit 104, shown in FIGURE 4F, line 176 through the armature and normally closed contact of relay 178, line 180, through the lefthand armature and now closed contact of energized relay 144 to line 182, which is connected to the line marked "DEA" in the controller 56 shown in FIGURE 4A, which line is the phase A detector circuit for the controller 56. Consequently, it will be seen that through this circuit continuous detector actuations of the overlap detector 54 will operate to provide the phase A movement 40 with extensions of the phase A proceed interval up to the pre-determined maximum established by the controller 56. As will be realized, this will result in a most efficient handling of traffic at the terminal intersection 36 under the assumed conditions.

Similarly, if the phase B movement 44 is receiving the right-of-way, the overlap movement detector 54 will operate as though it were connected in parallel with the phase B detector 46 by virtue of identical circuit connections through the interlock unit 104. In this situation, the relay 186 in FIGURE 4F will be energized by the hot feed placed on line 188, which is connected to the phase B green signal circuit so as to receive the hot feed during the phase B proceed interval. The energization of relay 186 will connect the overlap detector 54 circuit ground feed on line 180 as previously set forth through the lefthand armature and upper normally open contact of the energized relay 186 to line 190 in FIGURE 4F. The line 190 is connected, as seen in FIGURE 4H, to the junction point 192 in the overlap unit 112. It will be also noted, that the phase B detector 46 completes a circuit, when actuated, from the grounded line 140 through line 194, closed detector 46 to line 196, which is also connected to the junction point 192. These detector circuits are completed to give phase B extensions when either the phase B, or the overlap detectors are actuated by completing the circuit comprising line 198 in the overlap unit 112 in FIGURE 4H, through the lower armature and normally closed contact of relay 200 to line 202, which is connected to the line marked "DEB" in the controller 56 (FIGURE 4A), this being the phase B detector circuit. Accordingly, it will be apparent that actuations of the overlap detector 54, during the phase B proceed interval, will serve to extend this interval to its maximum by virtue of the operation of the terminal intersection controller Number One, identified by reference numeral 56. Lines 168A and 196A connect the detectors 72 and 64 to achieve the same results in units 108 and 114, respectively.

As set forth in the general description, a third function of the interlock unit 104 is to discontinue the phase A extension if the right-of-way is called from phase A to phase B by an actuation of the phase B detector 46. Referring to FIGURE 4F, it will be seen that an actuation of the phase B detector 46, during the phase A green interval, will connect the ground feed from line 140 through the phase B detector 46, to line 196. This ground feed is connected by line 190 through the righthand armature and normally opened contact of energized relay 144 to line 210, through the coil of relay 178 to line 212, which is connected to the hot 12 volt line 214. The line 214 receives the hot 12 volt feed from the line 216, which in turn receives the hot 12 volt feed from the detector transformer in the controllers 56 and 78. The circuit just described will serve to energize the relay 178, which in turn will cause the armature thereof to break the circuit previously described from the overlap detector 54 to the phase A detector circuit in the timer 56, thereby preventing further actuations of the overlap detector 54 from extending the phase A green interval. Line 214A supplies the hot 12 volt feed to unit 108 for a similar function.

The fourth function of the detector interlock unit 104 is to prevent actuations of the overlap detector 54 from extending the phase B, when the right-of-way is called from phase B to phase A, by actuations of the phase A detector 42. This is accomplished in a manner similar to that described in the preceding paragraph, by energizing the relay 174 so as to break the circuit from the overlap detector to the phase B detector circuit in the controller 56 by opening the armature of the relay 174. The relay 174 is energized by virtue of the circuit completed when the relay 186 is energized during the phase B green interval, this circuit comprising the grounded line 140, line 220, through the closed phase A detector 42, line 222 in FIGURE 4E, which is connected to the line 182, which is connected as shown in FIGURE 4F, to line 224, which passes through the righthand armature and normally opened contact of energized relay 186 to line 226, which is connected through the coil of relay 174 to the hot line 212, thereby energizing the relay 174 and opening the detector overlap circuit previously described.

If, however, the phase B movement 44 is receiving the right-of-way signal display, and both the phase A detector 42, and the phase C detector 50 are actuated, actuations of the overlap detector 54 will continue to extend the phase B right-of-way signal display by virtue of the fact that the phases are set up in alphabetical order on the cam unit of the main timer, and accordingly phase C will always follow phase B where both phases have received a detector actuation. This is accomplished through the circuit comprising the grounded line 140, line 230 (FIGURE 4E), which is connected through the closed phase C detector 50 to line 232, line 234 (FIGURE 4G), which is connected through the coil of relay 236 to the hot 12 volt line 214 (FIGURE 4F), thus energizing this relay. The energization of relay 236 completes the overlap detector circuit from line 170 through the armature and normally open contact of energized relay 236, line 238, line 176, armature and normally closed contact of de-energized relay 178, line 180 through the lefthand armature, and normally opened contact point of energized relay 186 to line 190, which is connected as previously described, to the phase B detector circuit in the terminal intersection controller 56. It will be apparent, therefore, that actuations of the overlap detector 54 will continue to extend the phase B right-of-way signal display in the event that a phase C detector actuation is received during the phase B green interval, even though a phase A detector actuation is also received. Lines 232A and 234A connect detector 68 to units 108 and 114 to achieve similar results.

The fifth function of the interlock unit 104 is to transfer the right-of-way from phase C by virtue of actuations of the overlap detector 54 to either of phases A or B, depending upon which of these phases receives a detector actuation. If, however, no actuations are received on either of the phase A, or phase B detectors, simultaneous with, or subsequent to the actuation of the overlap detector 54, the right-of-way signal display will be transferred to the phase B movement. This is due to the skip phase feature of the cam unit in the main controller 56, as described in the Jeffers patent above referred to.

Referring to FIGURES 4D and 4F, it will be seen that the hot feed on line 138 is connected to line 250, which is connected through the armature and normally closed contact of de-energized relay 142 to line 252, through the armature and normally open contact of relay 254, which is energized by an actuation of the overlap detector 54, to line 256, line 258, which is connected to the line marked "MX" and identified by reference numeral 260 in the controller 56, through the resistor 262 and rectifier 264, coil of relay 266, to grounded line 268, thereby energizing the relay 266. Relay 266 is an addition to the controller, as shown in the Jeffers patent above referred to, and which serves when energized to connect any of the closed maximum cam contacts MXA, MXB, or MXC, through the closed armatures of the energized relay 266 to the maximum relays, which are identified by the reference numerals 70, 71, 72, these being the same reference numerals as applied thereto in the Jeffers patent. As described in that application, an actuation of any of the maximum relays will serve to actuate the maximum timer 46, which in turn will permit the cam unit to cycle if called upon completion of the maximum time interval. Consequently, the relay 266 in the controller 56 merely serves in effect to permit the cam unit in the controller 56 to be cycled in the manner to be next described.

The hot feed on the line 250 is normally prevented from completing the circuit to the relay 266 in the main timer during either phase A, or B, by virtue of the energization of the relay 142 during these phases, as previously described. Also, it will be noted that a closure of the detector 54 will energize the relay 254 by completing the ground feed from the line 140, line 166, closed detector 54, line 168, through the coil of relay 254 to the hot 12 volt line 214, FIGURES 4E and 4F.

It will also be noted that the hot feed on line 256 will pass through the coil of relay 272 to the grounded line 148, thus energizing the relay 272. The energization of the relay 272 causes the righthand armature and normally open contact to complete a circuit from the hot line 252 through the coil of relay 272 to grounded line 148, providing a holding circuit to maintain the energization of the relay 272. The energization of the relay 272 also causes the lefthand armature to move into engagement with its normally open contact completing a circuit from hot line 138 in FIGURE 4A, to line 280, which is connected as shown in FIGURE 4F, through the armature and normally open contact of energized relay 272 to line 282, which in turn is connected by line 284 to the line marked "CY" in the controller 56, shown in FIGURE 4A, the line CY being connected in the plate circuit of timer 44, thus shunting the stop circuit cam contacts and their associated relay contacts. This permits the cam unit to cycle upon completion of the maximum timer interval. The energization of this cycle circuit will cause the right-of-way to be transferred from the movement on which the controller is resting, this being the phase C movement in this example, to either of the A or B phases. If a call is received on either of the phase A, or phase B detectors, the right-of-way will be transferred to the phase receiving the call, and if no call is received, the right-of-way will be transferred to the phase B movement, skipping the phase A right-of-way sequence. This is due to the operation of the controller 56 which, as set forth in the Jeffers patent, will skip the phase not having any detector actuation. It will be seen by this arrangement, that under these conditions the phase B movement, which is the straight-through movement in intersection 36, will receive the right-of-way, this being the most efficient traffic pattern under these conditions.

It will be apparent, therefore, that the interlock unit 104 or 108, as the case may be, will cause the controllers 56 and 78, respectively, to cycle from the phase C proceed interval into phase B (or phase A if a call has been received on the phase A detector simultaneously or subsequent to the reception of an actuation of the overlap detector 54), and to that extent the interlock units modify the operation of the multi-phase full-actuated controllers 56 and 78, as set forth in the Jeffers patent previously referred to, so as to cycle the cam units of these controllers in the situation where there is an actuation of the overlap detector and no actuations on either of the phase A and phase B detectors.

The preceding description has illustrated the manner of operation of the Number One detector interlock unit shown in FIGURE 4F and identified by reference numeral 104 in conjunction with the Number One terminal intersection controller 56, in response to various assumed conditions of traffic actuations of the detectors of movements 40, 44, 48 and 52 at the intersection 36.

Referring now to FIGURE 4G it will be seen that detector interlock Number Two, which is identified by reference numeral 108, is identical to the interlock unit 104, the various connections being made to the Number Two terminal intersection controller 78 by means of cable 110. Accordingly, it will be apparent and will not, therefore, be described in detail, that unit 108 operates in exactly the same manner in conjunction with controller 78 as described above for controller 56 and unit 104. Accordingly, the various movements 58, 62, 66 and 70 will be given the right-of-way signal display for control of these movements through the intersection 28 as above described in connection with intersection 36.

Referring to FIGURE 3 it will be seen that a single intersection is illustrated therein. For ease of description and reference this intersection and the movements therethrough have been supplied with the same reference numerals as applied to the Number One intersection shown in FIGURE 1.

An intersection of this type may be provided with the multi-phase full-actuated controller 56, a detector interlock unit 104 and a single phase overlap unit 112, these units being interconnected by cables 106, 116 and 117 as indicated in FIGURE 3. It will be understood that in such an application the units 104 and 112 would be connected to each other and to the controller 56 and with detectors 42, 46, 50 and 54 in the manner indicated in the circuit diagrams shown in FIGURES 4A to 4I inclusive. This will result in the overlap movement 52 and its detector 54 operating in the manner previously described to give the most efficient traffic movement through the intersection 36.

It will be further noted that in such an application the stop circuits 130, 132 and 134 in controller 56 would be connected by a common buss to the carry-over stop circuit line 136 which is in turn connected to the hot line 138 to operate the controller 56 in substantially the manner described in connection with the Jeffers patent above referred to with the exception of the addition of the relay 266 which modifies the operation of the controller as previously described.

*Offset timers*

The units 96 and 98, referred to as offset timers, are coordinating units and control the main controllers 56 and 78 in such a manner so as to provide for progression through the diamond interchange. The main purpose of the offset timer is to prevent similar phases on each of the controllers 56 and 78 from receiving the right-of-way signal display simultaneously for a pre-determined amount of time which pre-determined amount of time is referred to as the offset time. The pre-determined amount of time or offset time will commence when one of the controllers begins to indicate the proceed signal to one of the two identical phases.

Referring briefly to FIGURE 1, the offset time is to allow traffic entering the intersection 36 on the phase C movement 48 a sufficient amount of time to turn left on to the eastbound lane 17 and to reach either the detector 60 for the left turn movement 58, or the detector 72 for the straight-through movement 70, before an actuation of the detector 68 by a vehicle in the phase C movement 66 can call the controller 78 to the phase C right-of-way signal display interval. As previously described vehicles actuating the detectors 60 or 72 during the offset time will serve to hold controller 78 with the right-of-way being displayed to the overlap movement and either of movement 58 or 62. As will be obvious this will allow phase C traffic movement 48 sufficient time to clear the diamond interchange and will thereby prevent congestion of the diamond interchange.

Referring now to FIGURES 4D and 4E it will be seen that the two offset timers 96 and 98 used in the diamond interchange application are for the phase B artery offset and the phase C off-ramp offset, respectively. It will be understood that these designations are arbitrary and that if the movement 62 was termed the phase A movement and the movement 58 was termed the phase B movement, the offset timer unit 98 would be connected so as to give the straight-through movement (which under the assumed conditions would be the phase A movement) the offset time.

Each of the units 96 and 98 comprise a standard RC timer and for ease of description hereinafter only the unit 98 and its components will be described. The RC timer comprises, referring to FIGURE 4J, an electron discharge tube 290 having a plate relay 292, a charging capacitor 294, a pair of variable discharge resistors 296 and 298 and a pair of fixed discharge resistors 300 and 302. The unit 98 further includes a pair of two-pole double-throw relays 304 and 306, a pilot lamp 308 for test, maintenance, and service purposes to indicate when the offset timer unit is timing; and finally the unit includes a pair of manually operated switches 309 and 310.

Each of the offset timer units 96 and 98 controls an offset time from controller Number One to controller Number Two and from controller Number Two to controller Number One. This offset time, as above set forth, commences simultaneously with the start of the proceed signal display to any offset phases appearing in the sequence and will terminate at the expiration of the offset time controlled by the variable and fixed resistors 296 to 302 inclusive, as will be more completely described hereinafter. It will be apparent, therefore, that in all cases in the transfer of the right-of-way signal display as indicated in the flow diagram, the offset timers will prevent similar phases from appearing on each controller simultaneously for a pre-determined amount of time.

Figure 4J:
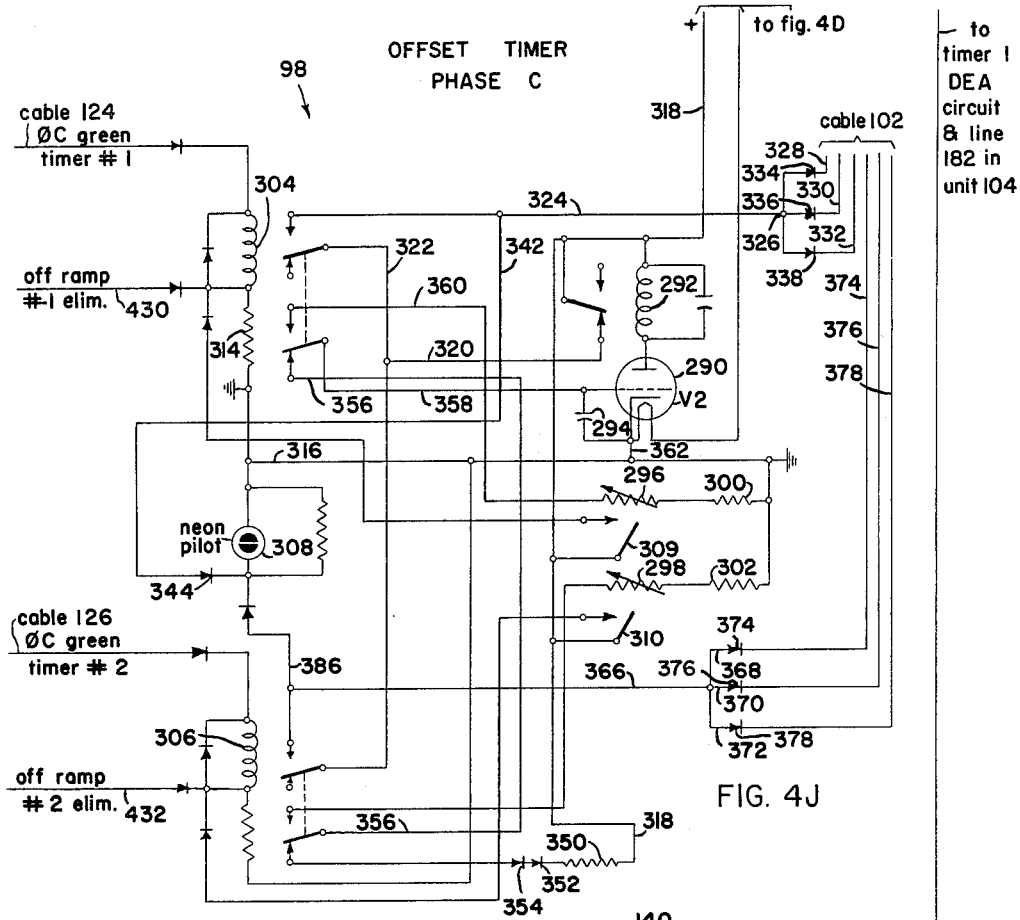
Figure 4E:
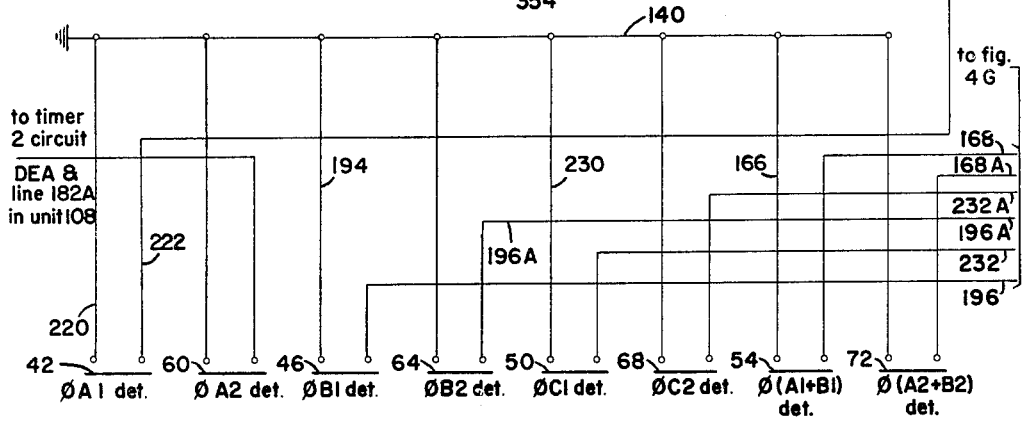
Figure 4:
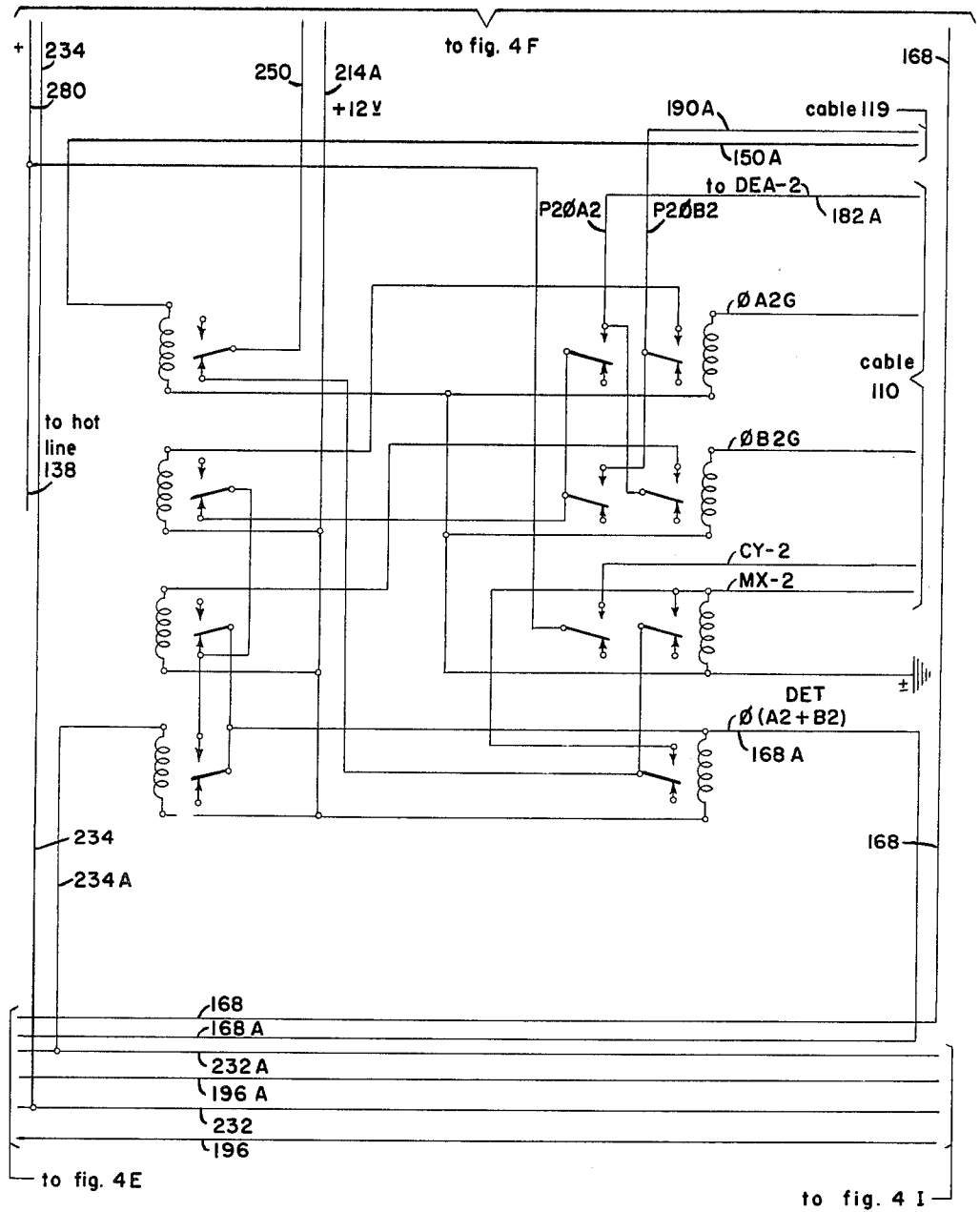
Figure 4:
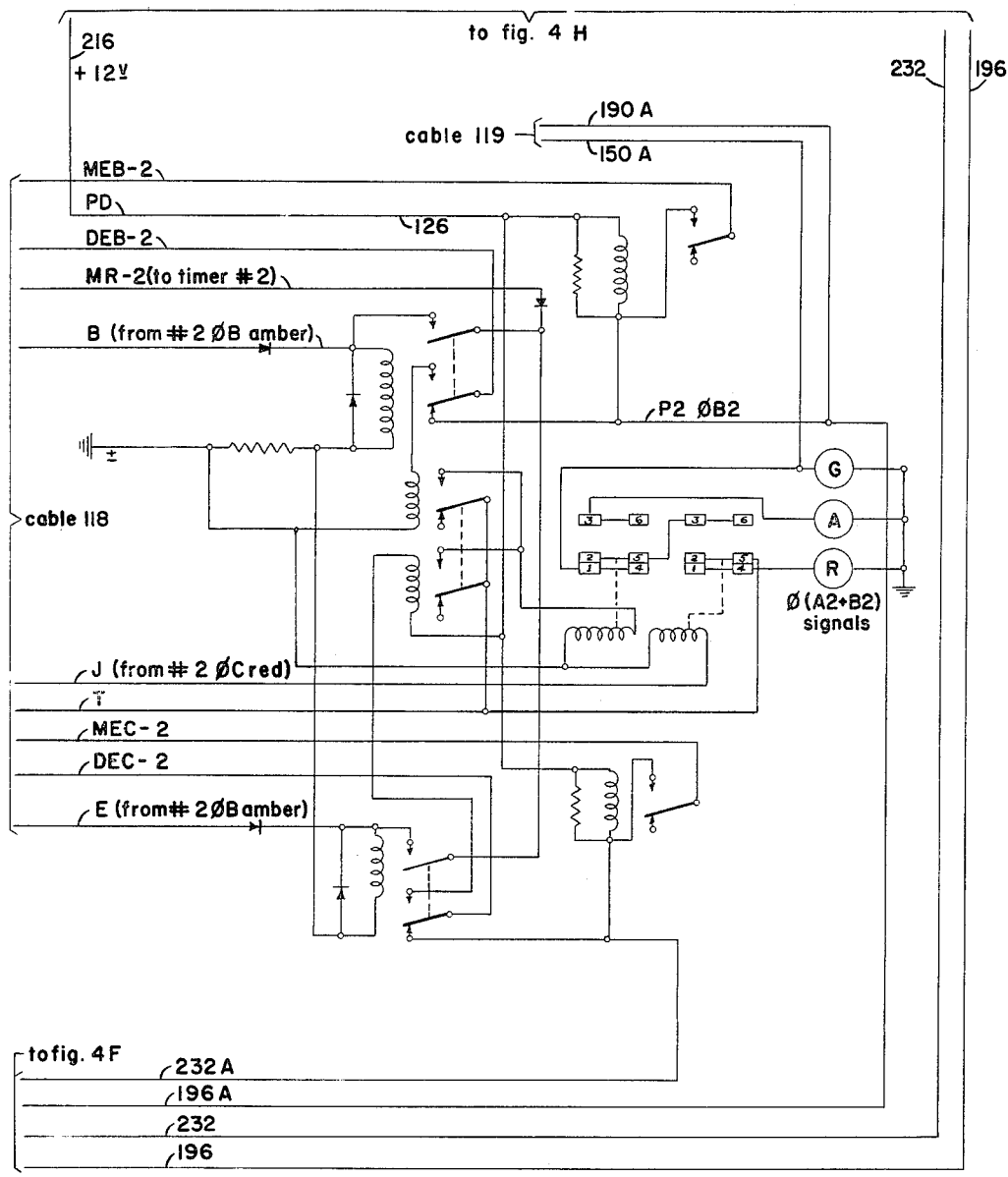

Referring to FIGURE 4J, wherein the phase C off-ramp offset timer 98 is shown, this unit will prevent the controllers 56 and 78 from giving the right-of-way signal display to both phase C movements 48 and 66 for a pre-determined amount of time (i.e., the offset time) after one of the controllers has moved to the phase C interval. It will be seen that the coil of relay 304 is provided with a hot feed by line 124 which is connected to the signal circuit line for the phase C green signal as shown in FIGURE 4A of controller 56, whereby when the signal is energized line 124 is provided with the hot feed. This circuit is completed through the coil of relay 304 and a resistor 314 to the grounded line 316, thereby energizing the relay 304. The energization of the relay 304 will complete a circuit from the hot line 138, line 318 in FIGURE 4D, which is connected as shown in FIGURE 4J through the armature and normally closed contact of relay 292, line 320, line 322, armature and normally open contact of energized relay 304, to line 324, which is connected at the junction point 326 to three lines 328, 330 and 332 which are connected through rectifiers 334, 336 and 338. The lines 328, 330 and 332 are connected as shown in FIGURES 4J and 4C through the coils of relays 334, 336 and 338, respectively, of relays in the stop circuit control unit 94 to a grounded line 340 to energize these relays for a purpose to be hereinafter described.

Referring again to FIGURE 4J the hot feed placed on line 324 will also complete a circuit by line 342 through the rectifier 344 and through the pilot light 308 to the grounded line 316 to energize and light the pilot lamp to indicate that the timer 98 is timing.

Referring now to FIGURE 4C the energization of the relays 334, 336 and 338 will cause the armatures of these relays to be separated from their normally closed contacts, thus opening the stop circuits STA, STB and STC in the Number Two controller 78, the stop circuits being connected by the cable 92, as indicated, through the armature and normally closed contacts of relays 334, 336 and 338 to a hot buss 346. It will be seen, therefore, that with the stop circuits for phases A, B and C of controller 78 opened by virtue of the energization relays 334, 336 and 338, the right-of-way signal display cannot be transferred by controller 78 to any other phase from the phase receiving the right-of-way signal display for the duration of energization of relays 334, 336 and 338. Further, it will also be obvious that controller 78 would be displaying the proceed signal to either the phase A movement 58 or the phase B movement 62, because if it was displaying the right-of-way to the phase C movement 66 the offset time would have expired during the previous cycle. Accordingly, since controller 78 is in either of phases A or B and controller 56 is in phase C, it will be seen by referring to the flow diagram of FIGURE 2 that a signal indication pattern will be displayed (this pattern being either of those shown in the second tier of FIGURE 2 and identified as C1–A2 or C1–B2) that will allow the traffic to exit the limited access highway from the southbound lane 12 via ramp 30 and proceed through intersections 36 and 28, forming the diamond interchange without stopping. The offset time will, therefore, normally be set to give a sufficient amount of time for vehicles exiting the freeway on ramp 30 at intersection 36 to travel through intersection 36 and to reach either the phase A detector 60 or the overlap detector 72 at intersection 28 to thereby extend the right-of-way signal display to phase A or phase B, as the case may be, together with the overlap phase.

The energization of the relay 304 will start the timing operation of the RC timer in the unit 98 by initiating the discharge of the timing capacitor 294. The timing capacitor 294 is normally charged through a circuit comprising hot line 318, which passes through a fixed resistor 350, and a pair of rectifiers 352 and 354 through the normally closed contact and lower armature of de-energized relay 306, to line 356 which is connected through the lower closed contact and armature of normally de-energized relay 304 to line 358, which is connected to the top of the capacitor 294, the opposite side of which is connected to a grounded line as indicated. This charging circuit will, therefore, be broken by the energization of relay 304 through the lower armature thereof and will commence the discharge of the capacitor 294. Under this condition the discharge path for capacitor 304 comprises line 358, armature and normally open contact of energized relay 304, line 360, which is connected through the variable resistor 296 and fixed resistor 300 to the grounded line, as indicated, to discharge the capacitor 294. As will be obvious, the amount of time necessary to discharge the capacitor 294 to a point where the grid of 290, which is connected to the top of capacitor 294 as indicated, will permit the tube 290 to conduct current, will be determined by the setting of the variable resistor 296 and the fixed value of resistor 300. When the tube 290 conducts the relay 292 will become energized through the circuit comprising the grounded line 362, tube 290, coil of relay 392, to the hot line 318. The energization of relay 292 will cause its armature to move out of engagement with its associated contact, thereby breaking the hot feed to line 320 from line 318 which in turn will break the circuits previously described which energized the relays 334, 336 and 338. The energization of relay 292 will also disconnect the hot feed from line 342, thereby de-energizing the pilot light 308 thus indicating the end of offset time.

At this point, therefore, the stop circuits STA, STB and STC, which are connected from the controller 78 to the unit 94 by cable 92, will again be completed by virtue of the de-energization of the relays 334, 336 and 338, thereby allowing the controller 78 to function in its normal manner and permit the transfer of the right-of-way signal display from the phase on which it is resting to any other phase.

It will be apparent from the above explanation, in connection with effecting an offset in the display of the C phase go signal at intersection 2, by a phase C actuation at intersection 1, that energization of the relay 306, by a similar actuation at intersection 2 would offset the corresponding signal display at intersection 1. This is accomplished through a circuit comprising the hot feed on line 318 which is connected through the upper armature and normally open contact of energized relay 306 to line 366, which is connected by lines 368, 370 and 372 through rectifiers 374, 376 and 378 to energize the relays 380, 382 and 384 in the control unit 94 shown in FIGURE 4C to open the stop circuits STA, STB and STC connected by cable 90 to the controller Number One shown in FIGURE 4A, thereby preventing this controller from transferring the right-of-way signal display. Also the hot feed on line 366 is supplied by line 386 to the pilot lamp 308 to indicate the timing of the offset time by an off-ramp actuation at Intersection Two.

The phase B offset timer shown in FIGURE 4D operates in a similar manner with the exception of the stop circuits for only phases C and B being opened by the energization of the relay 387 in the phase B offset timer unit 96. As seen in FIGURE 4D and FIGURE 4C there is no connection between the relay 334 and the phase B offset timer and between the relay 380 and the phase B offset timer. Accordingly, energization of the relay 387, which is caused by the hot feed placed on line 120, which in turn receives its hot feed during the proceed interval from the proceed signal circuit for phase B, will connect the hot feed on the line 318 in FIGURE 4D through the armature normally closed contact of relay 408 to line 410, line 412 through the armature and normally open contact of the now energized relay 387, to line 390, which is connected by lines 392 and 394 through rectifiers 396 and 398 to lines 330 and 332 to energize the relays 336 and 338.

The reason for this arrangement is best seen by referring now to FIGURE 1. Assume now, for example, the controller 56 is displaying the right-of-way to the phase C movement 48 in the intersection 36, and an actuation of the phase B movement 62 in the intersection 28 is received on the phase B detector 64. Under this set of conditions it is desirable that the phase B traffic movement 62, when it receives the right-of-way, receive an offset time sufficient to allow it to actuate either of the detectors 54, to allow the traffic to pass straight through the intersection 36, or the detector 42 to allow the traffic to turn left and pass out of the intersection 36. Accordingly, it is, therefore, necessary to prevent a subsequent actuation of the phase B detector 46 from calling the controller 56 to the phase B right-of-way signal display, because such a display would prevent the movement 62, which becomes the movement 40 when turning left in the intersection 36, from receiving the right-of-way signal display. Consequently, in the manner to be next described, the offset timer 96, shown in FIGURE 4D, functions to prevent the right-of-way from being transferred from the phase C movement 48 to the phase B movement 44 as a result of an actuation of the phase B detector 46. This is accomplished by opening the phase B stop circuit for controller 56 by the energization of the relay 382 in the control unit 94, shown in FIGURE 4C, in the manner to be next described. However, it is also to be noted that the right-of-way may be transferred from the phase C movement 48 to the phase B movement 46, as a result of an actuation of the overlap detector 54.

The energization of the relay 382 in control unit 94, shown in FIGURE 4C, to achieve the above outline desired results, is accomplished in the following manner.

Referring to FIGURE 4D, it will be seen that the line 122 receives a hot feed from line 400 which is connected to the green signal circuit for phase B in the controller 78, so that the line 400 will receive the hot feed during the proceed interval for phase B in intersection 28. The hot feed on line 122 will complete a circuit through the coil of relay 402 and resistor 404 to line 406, which is connected to the grounded line 140, thereby energizing the relay 402. The energization of relay 402 will connect a hot feed from line 318 through the armature and normally closed contact of the plate relay 408 in the offset timer 96 to line 410, line 412, through the armature and normally open contact of now energized relay 402 to line 414, which is connected through the rectifiers 416 and 418 to lines 420 and 422, respectively. The lines 420 and 422 are connected as shown in FIGURE 4C through coils of relays 384 and 382, respectively, to the grounded line 340 to energize these relays. The energization of relays 382 and 384 will open the stop circuits for phases B and C of controller 56 since the B and C stop circuits 132 and 134 are connected by cable 90 through the armature and normally closed contact of relays 382 and 384 to the hot line 346. Accordingly, the right-of-way will thus be prevented from being transferred from phase C to phase B.

Referring now to FIGURE 4F it will be remembered that the detector interlock unit 104 controls the overlap detector 54 for the phase A plus phase B overlap movement 52. Consequently, the hot feed placed on line 250 from the hot power supply line 138 in the offset timer 96, shown in FIGURE 4D, will be transferred by the line 250 through the armature and normally closed contact of de-energized relay 142 to the line 252, which is connected to the armature of relay 254. Since this relay is normally de-energized this circuit will, therefore not be completed. However, when the relay 254 becomes energized by an actuation of the overlap detector 54, as previously described, the hot feed on line 252 and the armature of the now energized relay 254 will be transferred to line 256 via the normally open contact of the relay 254, and from line 256 through the coil of relay 272 to the grounded line 148, thus energizing the relay 272. The energization of relay 272 will in turn connect the hot feed on line 252 to the maximum circuit line 258, which is connected as previously explained to the line 260 in the controller 56 to initiate operation of the maximum timing unit for the movement receiving the right-of-way signal display from controller 56.

Further, the energization of the relay 272 will connect the hot feed on line 280 in the detector interlock unit 104 through the lefthand armature and normally open contact of energized relays 272 to the cycle circuit 282, thus energizing the cycle circuit 284 in the controller 56, which as previously described will complete the plate circuit for the main timing means 44 in the controller 56 through the circuit shown in FIGURE 4A. The energization of this cycle circuit will cause the cam unit of the controller 56 to transfer the right-of-way from phase C to phase B if there are no calls on phase A by virtue of the skip phase operation of the controller 56, as more completely described in the Jeffers patent above referred to. If, however, there are calls on phase A detector 42 the right-of-way will be transferred to the phase A movement 40 by the controller 56 in the normal manner. The energization of the maximum circuit 258, as set forth above, will permit the maximum timer to time out the phase C interval in the standard manner described in the Jeffers patent, where there are continuous actuations of the phase C detector 50.

Each of the offset timers 96 and 98 are arranged so as to eliminate or cancel the offset timing from an external impulse. Referring to FIGURE 4J it will be seen that the line 430 is connected to the bottom of the coil of relay 304 and that the line 432 in like manner is connected to the bottom of the coil of relay 306. Consequently, it will be observed that when a hot feed is placed on the line 430, for example, either manually or automatically, this will prevent the relay 304 from being energized via hot feed on the line 124, since both sides of the coil 304 will be placed on the same potential. This will eliminate an off-ramp 30 Intersection One to Intersection Two offset time. In like manner, placing of a hot feed on line 432 will eliminate an off-ramp 22 Intersection Two to Intersection One offset time. The phase B offset timer 96, shown in FIGURE 4D, is also provided with identically operating circuits, as captioned, to eliminate either or both of the phase B artery offset times.

Referring to FIGURE 4J, these same results may be obtained by closing the manually operated switches 309 and 310, which will serve to connect a hot feed to the lower side of the coils 304 and 306, respectively, to eliminate or prevent the energization of these relays. As previously set forth, the offset timer for phase B, shown in FIGURE 4D, is provided with like switches for accomplishing similar results.

I claim:

1. A traffic control system for a pair of intersections located in close adjacency on an arterial highway, one of said intersections being intersected by a cross street having traffic movement C in one direction, the other of said intersections being intersected by a cross street having traffic movement C in a direction opposite to the movement C of the traffic on said first cross street, detectors located on said arterial highway at each intersection for actuation by a traffic movement B approaching the intersection on said arterial highway, a left turn detector located in said arterial highway at each of said intersections for actuation by left turn traffic A, which has previously passed through the other intersection of said pair, and a detector at each of said intersections and located in said arterial highway for actuation by an overlap traffic movement approaching the intersection, which traffic movement also has previously passed through the other intersection of said pair, whereby traffic movements A and B are mutually conflicting but are separately non-conflicting with said overlap movement, detectors located in said cross streets at each intersection for actuation by traffic movement C approaching the intersections on said cross streets, traffic signals at each of said intersections for directing the traffic movements therethrough, a three-phase, full vehicle actuated timer for each intersection connected to the detectors for traffic movements A, B, and C, and operable upon actuation of said detectors to display the proceed signals to said movements, and a detector interlock control means interconnecting said overlap movement detector with the detectors of said two conflicting movements A and B, and operable to cause display of the proceed signal to said overlap movement simultaneously with the display of the proceed signal to the one of said conflicting movements then having the proceed signal, said timer having means operable upon repeated additional actuations of said overlap detector for extending the proceed signal display to said one conflicting movement.

2. The traffic control system of claim 1 wherein said detector interlock includes means operable to discontinue the extension of the proceed signal display to the one of said conflicting movements upon actuation of the detector for the other of said conflicting movements.

3. The traffic control system of claim 1 wherein said detector interlock includes means operable during the extension of the proceed signal to traffic movement B by additional actuations of the overlap detector, to continue such extension upon the concurrent actuation of the detectors in traffic movements A and C.

4. The traffic control system of claim 1 wherein said detector interlock includes means operable, during display of the proceed signal to the C traffic movement, and upon actuation of the overlap detector, to cause display of the proceed signal to the overlap and B movements.

5. The traffic control system of claim 1 wherein said offset timing means interconnecting said three-phase timers, and operable upon display of the proceed signal to one of the movements B, C at one intersection and during the display of the stop signal to the corresponding movement at the other intersection of said pair to prevent display of the go signal to said corresponding movement at said other intersection for a pre-determined period of time following the diplay of the proceed signal to the one of the movements B, C at said first intersection.

6. The traffic control system of claim 1 wherein said offset timing means interconnecting said three-phase timers, and operable upon display of the proceed signal to one of the movements B, C at one intersection and during the display of the proceed signal to the overlap movement and movement A at the other intersection of said pair, to prevent cessation of the display of the proceed signals to said movements at said other intersection for a pre-determined period of time following the display of the proceed signal to the one of the movements B, C at said first intersection.

7. A traffic control system for two intersecting highways, the first of said highways having straight-through traffic movements C moving through the intersection in opposite directions, the second highway having a straight-through traffic movement B in one direction, and a straight-through overlap movement in the opposite direction, said second highway, also, having a left turn traffic movement A moving in the same direction as said overlap movement, detectors located in said highways for actuation by each of said traffic movements, traffic signals at said intersection for directing said traffic movements therethrough, a three-phase, full vehicle actuated timer connected to the detectors actuated by traffic movements A, B, and C, and operable upon actuation of said detectors to display proceed signals to said movements, and a detector interlock control interconnecting said overlap movement detector with the detectors of said two conflicting movements A and B, and operable upon actuation of said overlap movement detector to cause display of the proceed signal to the one of said conflicting movements then having the proceed signal, said timer having means operable upon repeated additional actuations of said overlap detector for extending the proceed signal to said one conflicting movement.

8. The traffic control system of claim 7 wherein said detector interlock includes means operable to discontinue the extension of the proceed signal display to the one of said conflicting movements upon actuation of the detector for the other of said conflicting movements.

9. The traffic control system of claim 7 wherein said detector interlock includes means operable during the extension of the proceed signal to traffic movement B by additional actuations of the overlap detector, to continue such extension upon the concurrent actuation of the detectors in traffic movements A and C.

10. The traffic control system of claim 7 wherein said detector interlock includes means operable, during display of the proceed signal to the C traffic movement, and upon actuation of the overlap detector, to cause display of the proceed signal to the overlap and B movement.

References Cited by the Examiner

UNITED STATES PATENTS

| 2,145,031 | 1/39 | Renshaw et al. | 340—35 |
| 2,883,645 | 4/59 | Du Vivier | 340—36 |
| 3,056,946 | 10/62 | Brocket | 340—35 |
| 3,121,213 | 2/64 | Du Vivier | 340—35 |

NEIL C. READ, *Primary Examiner.*

UNITED STATES PATENT OFFICE
CERTIFICATE OF CORRECTION

Patent No. 3,208,039                        September 21, 1965

Arthur E. Hilliker

It is hereby certified that error appears in the above numbered patent requiring correction and that the said Letters Patent should read as corrected below.

Column 3, line 34, for "designed" read -- designated --; column 5, line 8, for "top" read -- stop --; line 16, for "director" read -- detector --; line 40, for "unit" read -- units --; column 8, line 31, for "detetcor" read -- detector --.

Signed and sealed this 19th day of April 1966.

(SEAL)
Attest:

ERNEST W. SWIDER                              EDWARD J. BRENNER
Attesting Officer                                  Commissioner of Patents